Figure 1:
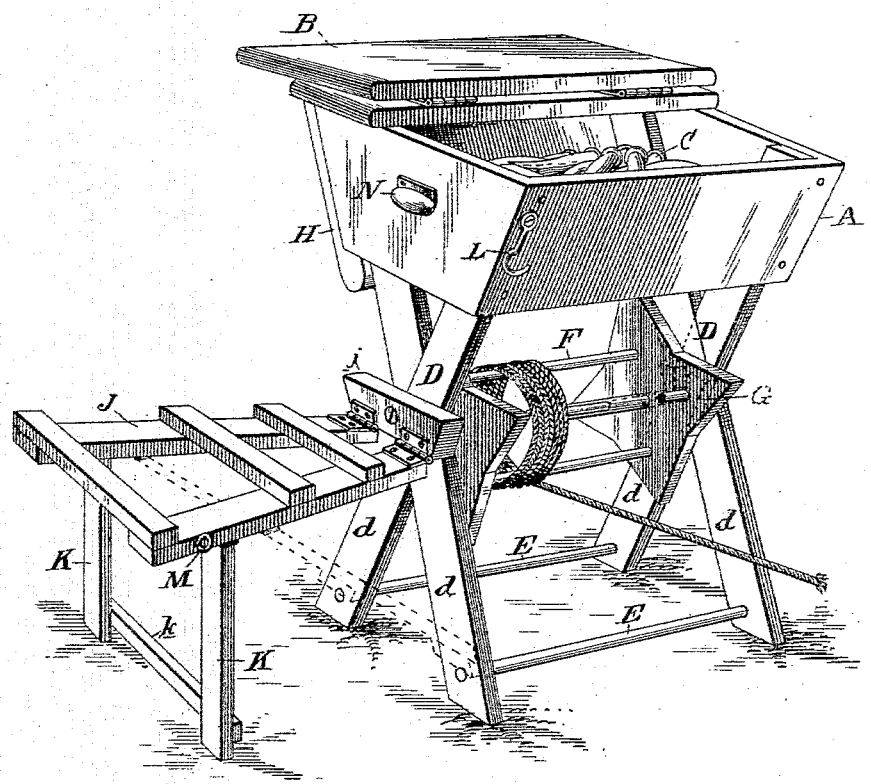

(Model.) 2 Sheets—Sheet 1.

J. MOSHER.
COMBINED CLOTHES LINE REEL, PIN HOLDER, &c.

No. 356,779. Patented Feb. 1, 1887.

WITNESSES
C. H. Raeder.
N. Turner

INVENTOR
Jethro Mosher
By T. J. W. Robertson
Attorney

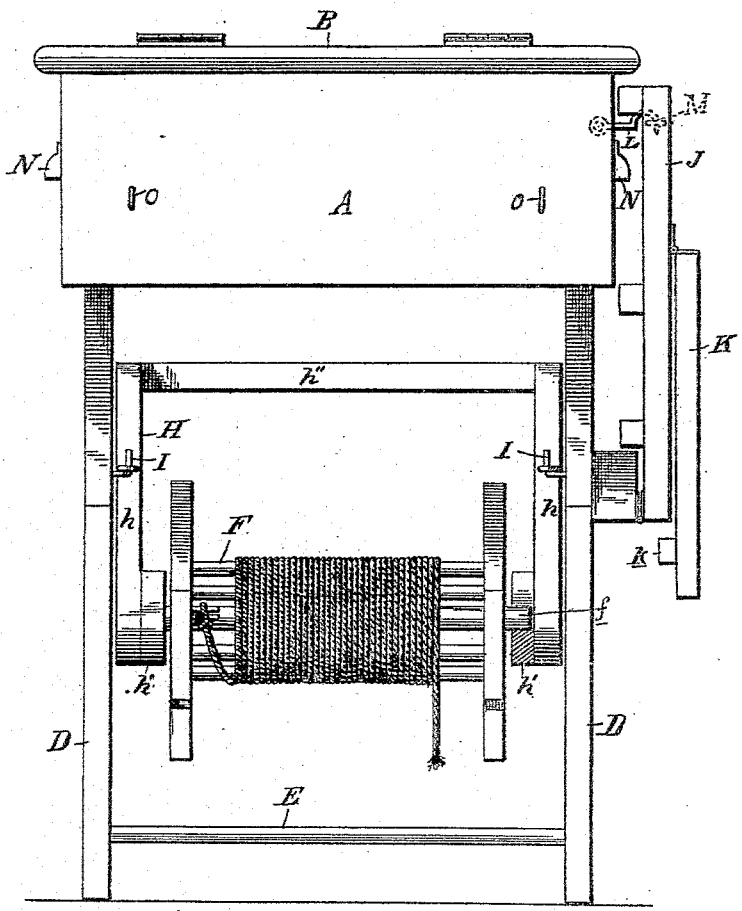

UNITED STATES PATENT OFFICE.

JETHRO MOSHER, OF NEW YORK, N. Y.

COMBINED CLOTHES-LINE REEL, PIN-HOLDER, &c.

SPECIFICATION forming part of Letters Patent No. 356,779, dated February 1, 1887.

Application filed April 1, 1886. Serial No. 197,439. (Model.)

*To all whom it may concern:*

Be it known that I, JETHRO MOSHER, a citizen of the United States, residing at New York, in the county of New York and State of New York, have invented certain new and useful Improvements in a Combined Clothes-Line Reel, Pin-Holder, &c., of which the following is a specification, reference being had therein to the accompanying drawings, in which—

Figure 1 represents a perspective view of my apparatus, and Fig. 2 a back elevation of the same slightly modified.

This improvement is designed to be used for the care and preservation of the clothes line and pins and to form a convenient device to be used in hanging clothes after they are washed, and in taking them in after they are dried; and the invention consists in the peculiar construction, arrangement, and combination of parts hereinafter described, and then pointed out in the claim.

Referring now to the details of the drawings, which show the preferable forms of my improvement, A represents a box provided with a hinged cover, B, and designed, primarily, as a receptacle for clothes-pins C. This box is mounted upon standards D, which are each preferably made of two pieces of suitable wood, $d\,d$, "halved" into each other at the points of intersection, and the two standards are connected by cross-bars E, whereby they are strongly braced.

Between the standards and underneath the box A is a clothes-line reel, F, which may run in bearings formed in V-shaped blocks G, (shown in dotted lines,) fixedly secured to the standards in Fig. 1; or a reel of suitable length may be mounted in a movable carrier, H, (shown in Fig. 2,) which carrier is formed of two uprights, $h\,h$, having bearings $h'$ for the axis $f$ of the clothes-line reel, and a crossbar, $h''$, which will serve as a handle by which it may be carried.

When the carrier H is used as a support for the reel within the standards, I provide hooks I, fastened to the legs or otherwise, upon which said carrier may be hung, as shown in full lines in Fig. 2.
The carrier, when not in use, as above stated, may be hung at the back of the box, or it may be used to carry the reel from place to place.

A carrier may be used to carry the detachable reel shown in Fig. 1 from point to point, and when not in use for this purpose may be hung upon the back of the box, as partially shown in Fig. 1, upon hooks O. (Shown in Fig. 2.)

At J is shown a support or stand for the clothes-basket, which stand is hinged to a block, $j$, fastened to the side of one of the standards, although it may be hinged direct to the standards, if preferred. To the under side of this stand are hinged two legs, K, which are connected together by a cross-bar, $k$, to brace and stiffen the same. These legs are shown in full lines as resting on the ground; but they may be set diagonally (as shown in dotted lines) so as to rest on blocks nailed or otherwise secured to the outer side of one of the standards D, and thus form braces instead of legs, which will be found more convenient when moving the article from place to place.

When the stand is not in use, it may be folded up against the side of the box, as shown in Fig. 2, and be fastened in that position by means of the hook L and eye M. At each end of the box is a handle, N, by which the device may be conveniently carried from place to place.

The operation is as follows: The line being upon the reel and the pins in the box and the reel placed either in the bearings formed in the blocks G, as in Fig. 1, or in the carrier H, as shown in Fig. 2, the first operation is to place the apparatus in a suitable position in the yard or drying-ground and then, taking the free end of the line in the hand, it is drawn off the reel as wanted and fastened to the posts or other means for supporting the line; or the reel may be carried from place to place in the carrier detached from the box, if preferred, until the line is unwound and secured in position. The apparatus is then placed in a convenient position for the next operation, (which is the hanging of the clothes,) and then by dropping down the stand, as shown in Fig. 1, it forms a convenient stand and an ample support for the clothes-basket, which should be placed thereon. It is then at a convenient height for handling the clothes, and the cover of the clothes-pin box being thrown back, as shown, both the clothes and pins can be readily reached without stooping, and thus the labor of hanging out clothes is very much lightened. When the clothes are dry, they are taken down and thrown into the basket and the pins into the box. After the clothes are taken down the line may be taken off the hooks or posts and dropped upon the ground, and then, by attaching one end of it to a pin or pins on one end of the reel, the operator may readily wind up the line by taking hold with one hand of the nearest point of one of the ends of the reel and causing the same to revolve while the rope is guided by the other hand.

If the yard is dirty or wet, and it is desired to prevent the line from coming in contact with the ground, the carrier H may be used for carrying the reel while the line is being wound on or unwound from the reel. In this case the operator in winding up the line unhooks the end of the line from its supporting hook or post and attaches it to the pin on the end of the reel and then winds up the line by turning the reel with one hand while the frame is held by the other, and moving from post to post as the line is wound up, thus keeping the line entirely from contact with the ground— a very great convenience in dirty weather. The line may be hung up in the same way by simply attaching one end of the line to the first hook, then going to the next hook, which will draw off the necessary amount of line, and, after hanging the line in position on the second hook, carrying the reel to the next hook, and so on until the line is all in place.

After the line is wound or unwound, as the case may be, the reel and carrier are hung in their appropriate places, as shown, and when the basket has been removed the stand is folded up and hooked in place. In this condition the apparatus is very compact and occupies but very little more room than an ordinary kitchen-chair, and can be placed in the kitchen, where it can be used as a small table or as a support for one end of the ordinary ironing-board.

I deem it important that the box A be independent of the reel and above the same, as by this arrangement the box is brought to a convenient height to enable the operator to easily reach the pins therein without stooping, and there is no danger of the pins and line becoming entangled, as would be the case were the reel arranged within the pin-box, as has been proposed. I also deem it important that the legs K K be hinged to the stand J, near the outer end thereof, whereby, when said stand is extended, as shown in Fig. 1, the legs form a stiff support for said stand.

What I claim as new is—

As a new article of manufacture, a laundry apparatus consisting of standards D D, the box A, fixedly attached to the top of said standards and provided with a cover adapted to serve as a table, the reel F, and bearings for the support of the same set between the standards, the stand J, hinged to said standards, and the leg K, hinged to said stand near its outer end, all constructed substantially as described.

In testimony whereof I affix my signature, in presence of two witnesses, this 31st day of March, 1886.

JETHRO MOSHER.

Witnesses:
 WM. OLAND BOURNE,
 GEORGE F. WILSON.